M. W. COLWELL.
Fence-Post.
No. 162,800.
Patented May 4, 1875.
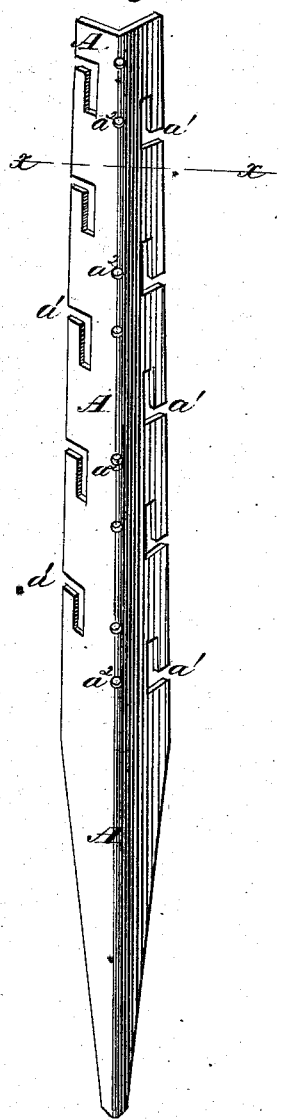
WITNESSES:
INVENTOR:
Myron W. Colwell
BY
ATTORNEYS.

UNITED STATES PATENT OFFICE.

MYRON W. COLWELL, OF DUNLAP, IOWA.

IMPROVEMENT IN FENCE-POSTS.

Specification forming part of Letters Patent No. 162,800, dated May 4, 1875; application filed April 3, 1875.

*To all whom it may concern:*

Be it known that I, MYRON W. COLWELL, of Dunlap, in the county of Harrison and State of Iowa, have invented a new and useful Improvement in Iron Fence-Posts, of which the following is a specification:

Figure 1 represents one of my improved posts. Fig. 2 is a cross-section of the same, taken through the line $x\ x$, Fig. 1.

Similar letters of reference indicate corresponding parts.

The object of this invention is to furnish an improved iron fence-post for wire and board fences, which shall be simple in construction, inexpensive in manufacture, light, strong, and durable, and convenient in use, being easily set in the ground.

The invention consists in a fence-post made of wrought sheet-iron, bent longitudinally into angular form, and having angular slots formed in its side edges, and holes formed in its angle, as hereinafter fully described.

A represents the post, which is made of wrought sheet-iron, cut into strips of the proper length and breadth, and bent longitudinally at a right angle, or nearly at a right angle, as shown in Fig. 2. The lower part of the post A, that enters the ground, is tapered, as shown in Fig. 1, so that it may be readily driven into the ground. In the side edges of the post A are formed right-angled slots $a^1$, the closed ends of the vertical parts of the slots $a^1$ being downward upon one side edge of the post A and upward upon the other, as shown in Fig. 1. In the angle of the post A are formed holes $a^2$, as shown in Fig. 1. When the post A is used for a wire fence the wires are placed in the angular slots $a^1$, and tightened in the usual way. When the post A is used for a board fence the boards are secured to it by wire bands, which are passed through the holes $a^2$ and twisted, or otherwise secured.

Having thus described my invention, I claim as new and desire to secure by Letters Patent—

The tapered fence-post A, made of wrought sheet-iron, bent longitudinally into angular form, and having angular slots $a^1$ formed in its side edges, and holes $a^2$ formed in its angle, substantially as herein shown and described.

M. W. COLWELL.

Witnesses:
 B. H. BEATTE,
 CHAS. L. ROBERTS.